May 21, 1940. E. W. MEIENBORN 2,201,910
TOY VEHICLE
Filed March 4, 1939
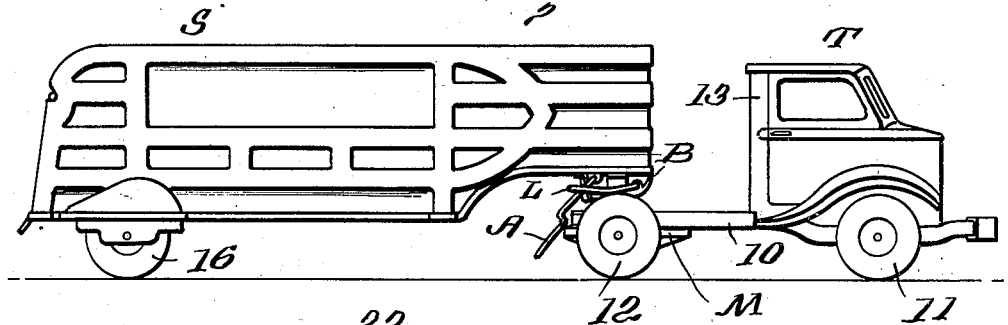
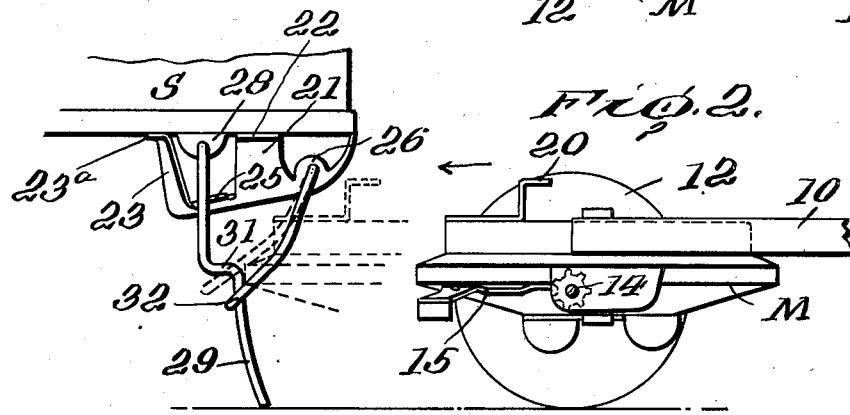
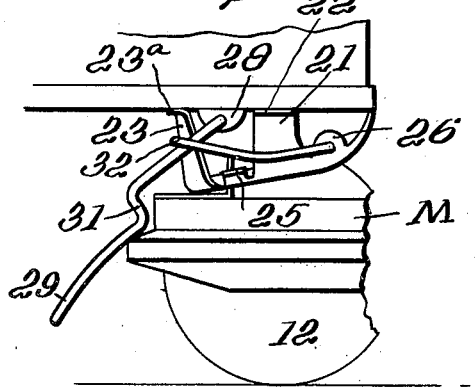
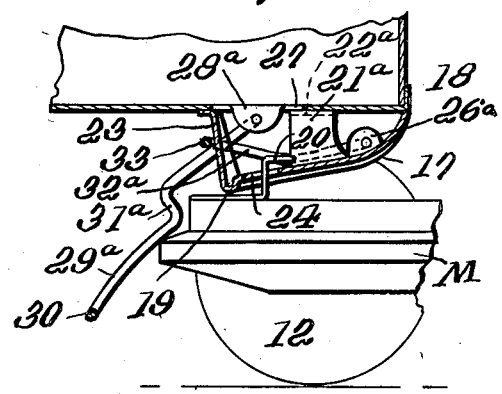
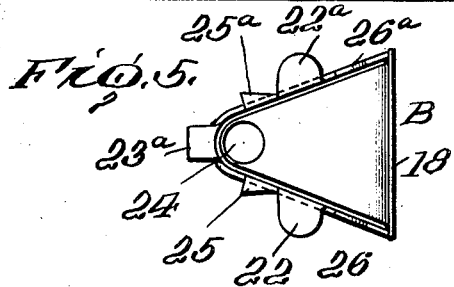
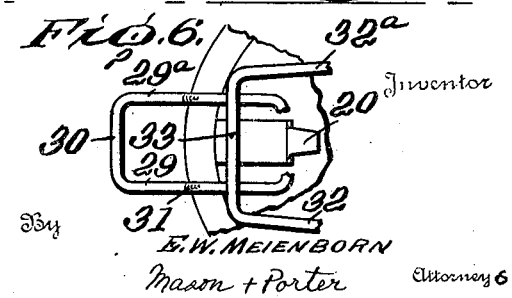
Inventor
E. W. MEIENBORN
By Mason + Porter
Attorneys Patented May 21, 1940

2,201,910

UNITED STATES PATENT OFFICE 2,201,910

TOY VEHICLE

Ewald W. Meienborn, Keene, N. H., assignor to Kingsbury Manufacturing Company, Keene, N. H., a corporation of New Hampshire Application March 4, 1939, Serial No. 259,871

6 Claims. (Cl. 46—202)

The present invention relates to new and useful improvements in toy vehicles, and more particularly to a toy vehicle including tractor and trailer units which are adapted to be detachably coupled together.

The invention is concerned generally with the provision of a wheeled toy vehicle which is adapted to simulate motor vehicles now commonly used in highway transportation. The vehicle includes a motor driven tractor unit and a trailer unit which is adapted to be detachably connected to the tractor unit. The rear end of the trailer unit is supported on ground-engaging wheels and the forward end thereof is adapted to rest on and to be detachably connected to the rear end of the tractor unit, thus constituting a semi-trailer.

An object of the invention is to provide a toy vehicle of the above type wherein the tractor and trailer units may be automatically coupled together by relative movement of the units toward one another.

A further object of the invention is to provide a toy vehicle of the above type wherein the tractor and trailer units are equipped with coupling members by which the units are connected and wherein the coupling member on the trailer unit is automatically supported in a position for subsequent coupling when the units are disconnected.

A still further object of the invention is to provide a toy vehicle of the above type wherein the supporting means for the trailer coupling member is locked in a supporting position to prevent the same from dropping to the ground.

A still further object of the invention is to provide a toy vehicle of the above type wherein a semi-trailer unit is automatically maintained by means of a supporting leg in a position for subsequent coupling to the tractor unit when the units are disconnected.

A still further object of the invention is to provide a toy vehicle of the above type wherein locking means are provided for maintaining the supporting means for the trailer in a position preventing the same from dropping to the ground.

The invention still further aims to provide a toy vehicle of the above type wherein the units may be automatically coupled together from various positions and wherein the supporting means for the unsupported end of the semi-trailer unit is automatically moved to and held in an inoperative position when the units are coupled together.

The invention still further aims to provide a construction which is inexpensive to manufacture, simple in construction, and efficient in use.

The above and other objects of the invention will in part be obvious and will be hereinafter more fully pointed out.

In the accompanying drawing,

Figure 1 is a side elevation of the toy vehicle showing the tractor and trailer units coupled together.

Figure 2 is an enlarged fragmentary view, partly in section, showing the adjacent ends of the tractor and trailer units with the trailer unit supported above the ground in a detached position, the dotted line position of the tractor unit indicating the manner in which the trailer supporting means is moved to an inoperative position during the coupling operation.

Figure 3 is a fragmentary side view showing the adjacent ends of the tractor and trailer units coupled together.

Figure 4 is a view, similar to Figure 3, showing the trailer unit and coupling parts in section.

Figure 5 is a detail bottom plan view of the coupling bracket on the trailer unit.

Figure 6 is a fragmentary plan view showing the position of the trailer supporting and locking means in an inoperative position.

Referring more in detail to the accompanying drawing, and particularly to Figure 1, the toy vehicle is illustrated as including a tractor unit T and a trailer unit S. The tractor unit includes a frame or chassis 10 having front and rear supporting wheels 11, 12, respectively, and a driver's cab 13 which is mounted on the frame. The rear wheels 12 of the tractor unit are driven by a motor (not shown) mounted in a motor housing M by means of a pinion 14 on the rear axle. As shown in Figure 2, a brake lever 15 is pivotally mounted on the motor housing and cooperates with the teeth on the pinion 14 for stopping the tractor unit. This brake mechanism may be of the type shown and described in the H. F. Davis patent, No. 2,066,286, dated January 5, 1937.

The trailer unit is of the semi-trailer type and the rear end thereof is supported on wheels 16. The front end of the trailer unit is unsupported but is adapted to rest on and be connected to the rear end of the tractor unit above the wheels 12. It is to be clearly understood that the body portion of the trailer unit and also of the tractor unit may be of any desired construction. The under surface of the forward end of the trailer unit S has secured thereto a coupling bracket B with which a hook on the tractor unit is adapted to engage for effecting movement of the tractor and trailer units in unison. When the trailer is disconnected from the tractor, a pivoted supporting member A is adapted to maintain the forward end of the trailer unit elevated above the ground so as to permit a subsequent coupling operation. A locking member L is pivotally connected to the coupling bracket B and aids in maintaining the member A in a position supporting the forward end of the trailer unit.

The details of the coupling and of the supporting and locking members will now be described in detail, reference being had particularly to Figures 2 through 6. The coupling bracket B is formed from sheet metal and includes a substantially triangular face portion 17 which is inclined downwardly toward the rear of the trailer unit with the apex also disposed toward the rear of the trailer unit. The forward edge 18 of the bracket member is secured to the trailer unit by welding or the like and is curved rearwardly to merge into the inclined face portion 17. The bracket member B is formed with a depending rib 19 which extends around the apex of the triangular face portion 17 and along the sides thereof so as to merge into the forward edge 18. This rib serves as a guide to direct a coupling hook 20 on the tractor unit toward the apex of the inclined surface 17 when the units are coupled together. The bracket member is formed with upstanding arms 21, 21a which are provided with lateral flanges 22, 22a, respectively, these flanges being secured by spot welding or the like to the under surface of the trailer unit. The bracket member is also provided with an upstanding arm 23 around the apex thereof and this arm is also provided with a flange 23a which is suitably secured, as by welding, to the undersurface of the trailer unit. At the apex of the triangular face portion 17, there is provided an opening 24 into which the hook 20 on the tractor unit is adapted to pass when the units are coupled together.

The bracket member is also provided with laterally extending arms 25, 25a which form stop means, the purpose of which will be hereinafter more fully pointed out. Adjacent the forward edge 18 of the bracket member, there are provided at the sides thereof upstanding apertured lugs 26, 26a in which the locking member L is pivotally mounted. A portion of the bottom of the trailer unit is cut away, as at 27, above the opening 24 in the bracket member, and portions of the metal forming the bottom of the trailer unit are bent downwardly to provide depending apertured lugs 28, 28a in which the supporting member A is pivotally mounted.

The supporting member A is substantially in the form of a U-shaped wire member having leg portions 29, 29a and a closed end portion 30. The leg portions 29, 29a are disposed on the outside of the rear end of the bracket member B and the free ends of the leg portions are bent inwardly to extend into the apertures in the depending lugs 28, 28a. Thus, the supporting member A is connected to the trailer unit for free pivotal movement. The leg portions 29, 29a are offset intermediate the ends thereof, as at 31, 31a, respectively, to provide shoulders with which the locking member L is adapted to cooperate.

The locking member L is also in the form of a U-shaped wire having leg portions 32, 32a and a closed end portion 33. The leg portions 32, 32a are disposed outside of the leg portions of the supporting member A and the free ends of the leg portions 32, 32a are bent inwardly to extend into the apertures in the upstanding lugs 26, 26a on the bracket member B. The locking member L is thus mounted for free pivotal movement. The leg portions 32, 32a on the locking member are curved rearwardly and the closed end portion 33 is disposed beneath the offset portions 31, 31a on the supporting member A when the forward end of the trailer is supported thereon.

When the trailer unit is disconnected from the tractor, both the supporting member A and the locking member L swing downwardly by gravity to the full line position shown in Figure 2. The ears 25, 25a are disposed in the path of movement of the leg portions 29, 29a of the supporting member and thus serve as stops for limiting forward movement of the supporting member. Thus, rearward movement of the trailer unit will not cause the supporting member A to be shifted from its position supporting the forward end of the trailer. The locking member L also drops by gravity so that the closed end portion 33 thereof is disposed beneath the offset portions 31, 31a on the legs of the supporting member. In this position, any forward movement of the trailer unit may cause slight movement of the supporting member A, but the closed end portion 33 of the locking member L will engage the offset portions 31, 31a so as to prevent the supporting member from moving to such an extent that the forward end of the trailer unit will drop.

When the forward end of the trailer unit is maintained in an elevated position by the supporting member A as shown in Figure 2, the tractor unit may be coupled thereto by relative movement of the units toward one another. When the tractor unit is pushed rearwardly toward the forward end of the trailer unit, the motor housing M will engage the arms 32, 32a of the locking member L and gradually elevate the same to a position out of contact with the offset portions 31, 31a in the legs 29, 29a. The length of the leg portions 32, 32a of the locking member is such that the closed end 33 thereof will clear the offset portions in the legs of the supporting member. Thus, further rearward movement of the tractor unit will continue to elevate the locking member and will also move the supporting member in a counterclockwise direction. Further rearward movement of the tractor unit will place the hook 20 in engagement with the inclined surface 17 and slightly raise the forward end of the trailer unit so that the motor housing M will force the supporting member A and the locking member L upwardly and ultimately to the position shown in Figures 3 and 4. The rib 19 on the bracket member B serves to guide the hook 20 toward the apex of the surface 17 so that the hook will enter the aperture 24. In this position, the tractor and trailer units are coupled together and the supporting member A and the locking member L are maintained in an elevated inoperative position. The guiding rib 19 is useful in that it permits the automatic coupling of the tractor and trailer units from various angular positions of the tractor unit relative to the trailer unit.

When it is desired to disconnect the tractor and trailer units, the trailer unit may be moved forwardly or the tractor unit may be moved rearwardly so that the forward end of the trailer unit can be slightly raised to permit the hook 20 on the tractor unit to be removed from the opening 24 in the bracket member B. When it is disconnected, the tractor unit is moved away from the trailer unit so that the supporting member A and the locking member L will move downwardly under the influence of gravity in a counterclockwise direction to the position shown in Figure 2. Thus, the forward end of the trailer unit is automatically maintained in an elevated position by the supporting member A for a subsequent coupling operation. The locking member L is also automatically brought into a locking position for preventing any movement of the supporting member which will permit the forward end of the trailer to drop down.

From the foregoing description, it will be readily seen that the present invention provides a toy vehicle of the tractor and trailer type wherein the tractor and trailer units may be automatically coupled together. There is also provided supporting means for the unsupported end of a semi-trailer unit. The supporting means is automatic in operation and includes a supporting member which moves to a supporting position when the units are disconnected. A locking member also moves to a position maintaining the supporting member in its supporting position. When the units are coupled together, the locking member is released and the supporting member is elevated by movement of the units to a coupled position.

While one form of the invention has been shown for purposes of illustration, it is to be clearly understood that various changes in the details of construction and arrangement of parts may be made without departing from the scope of the invention as set forth in the appended claims.

I claim:

1. In a toy vehicle including a semi-trailer unit and a tractor unit having a coupling element, the provision of a cooperating coupling member on the trailer unit with which the coupling element on the tractor unit is adapted to engage, a U-shaped wire supporting member having the free ends thereof pivotally mounted adjacent the forward end of the semi-trailer unit and adapted to assume an operative position under the influence of gravity when the units are disconnected for maintaining the forward end of the semi-trailer unit in an elevated position for a subsequent coupling operation, said cooperating coupling member having laterally extending stop means engageable with the legs of said U-shaped wire supporting member for limiting movement of said supporting member in one direction from an operative supporting position when the units are disconnected, the legs of said supporting member being offset intermediate the ends thereof, and a U-shaped wire locking member having the free ends thereof pivotally connected adjacent the forward end of the semi-trailer unit and operable by gravity for positioning the closed end thereof beneath the offset portions of the legs of said supporting member whereby to limit movement of said supporting member in an opposite direction when the units are disconnected, the closed end of said locking member being shiftable to a position clear of the offset portions on the legs of said supporting member by engagement with the tractor unit during the coupling operation and said supporting member being shiftable to an inoperative position by engagement with the tractor unit during the coupling operation.

2. In a toy vehicle including a semi-trailer unit and a tractor unit having a coupling element, the provision of cooperating coupling means on the trailer unit with which the coupling element on the tractor unit is adapted to engage, a supporting member pivotally mounted at the forward end of the semi-trailer unit for maintaining the same in an elevated position for a subsequent coupling operation when the units are disconnected, and means including a locking member pivotally connected at the forward end of the semi-trailer unit independent of the pivotal connection of said supporting member and spaced therefrom for engaging said supporting member to maintain the same in a supporting position when the units are disconnected, said locking member and said supporting member being shiftable to an inoperative position by engagement with the tractor unit during the coupling operation.

3. In a toy vehicle including a semi-trailer unit and a tractor unit having a coupling element, the provision of cooperating coupling means on the trailer unit with which the coupling element on the tractor unit is adapted to engage, a supporting member pivotally connected to said coupling means adjacent the forward end of the semi-trailer unit and adapted to assume an operative position under the influence of gravity when the units are disconnected for maintaining the forward end of the semi-trailer unit in an elevated position for a subsequent coupling operation, and means including a locking member pivotally connected to said coupling means entirely independent of the pivotal connection of said supporting member and in advance thereof, said locking member being operable by the influence of gravity for engaging said supporting member to maintain the same in a supporting position when the units are disconnected, said locking member and said supporting member being shiftable to an inoperative position by engagement with the tractor unit during the coupling operation.

4. In a toy vehicle including a semi-trailer unit and a tractor unit having a coupling element, the provision of a cooperating coupling member at the forward end of the semi-trailer unit with which the coupling element on the tractor unit is adapted to engage, a supporting member having one end thereof pivotally connected to said coupling member and adapted to assume an operative position under the influence of gravity when the units are disconnected for maintaining the forward end of the semi-trailer unit in an elevated position for a subsequent coupling operation, the cooperating coupling member on the semi-trailer unit having stop means engageable with said supporting member for limiting movement of said supporting member in one direction from an operative supporting position when the units are disconnected, and a locking member pivotally connected to said coupling member independent of the pivotal connection of the supporting member and operable under the influence of gravity for engaging said supporting member intermediate the ends thereof whereby to limit movement of said supporting member in the opposite direction when the units are disconnected, said locking member and said supporting member being shiftable to an inoperative position by engagement with the tractor unit during the coupling operation.

5. In a toy vehicle including a semi-trailer unit and a tractor unit having a coupling element, the provision of a cooperating coupling member at the forward end of the semi-trailer unit with which the coupling element on the tractor unit is adapted to engage, a supporting member having one end thereof pivotally connected to said coupling element and adapted to assume an operative position under the influence of gravity when the units are disconnected for maintaining the forward end of the semi-trailer unit in an elevated position for a subsequent coupling operation, the coupling member on the semi-trailer unit having stop means engageable with said supporting member for limiting movement thereof in one direction from an operative supporting position when the units are disconnected, said supporting member having an offset portion intermediate the ends thereof, and a locking member pivotally connected to said coupling member independent of the pivotal connection of said locking member and operable under the influence of gravity for engaging the offset portion on said supporting member whereby to limit movement of the said supporting member in the opposite direction when the units are disconnected, said locking member and said supporting member being shiftable to an inoperative position by engagement with the tractor unit during the coupling operation.

6. In a toy vehicle including a semi-trailer unit and a tractor unit having a coupling element, the provision of a cooperating coupling member at the forward end of the semi-trailer unit with which the coupling element on the tractor unit is adapted to engage, a U-shaped wire supporting member having the free ends thereof pivotally connected to said coupling member and adapted to assume an operative position under the influence of gravity when the units are disconnected for maintaining the forward end of the semi-trailer unit in an elevated position for a subsequent coupling operation, said cooperating coupling member having laterally extending stop means engageable with the legs of said U-shaped wire supporting member for limiting movement of said supporting member in one direction from an operative supporting position when the units are disconnected, and a locking member pivotally connected to said coupling member independent of the pivotal connection of said supporting member and in advance thereof and operable under the influence of gravity for engaging the legs of said supporting member intermediate the ends thereof whereby to limit movement of said supporting member in the opposite direction when the units are disconnected, said locking member and said supporting member being shiftable to an inoperative position by engagement with the tractor unit during the coupling operation.

EWALD W. MEIENBORN.